Oct. 16, 1956 K. R. HOYT 2,767,346

APPARATUS AND METHOD FOR REGULATING TELEVISION TARGET POTENTIAL

Filed Oct. 5, 1953 2 Sheets-Sheet 1

INVENTOR.
KARL ROBERT HOYT

BY Stedman B Hoar

AGENT

Oct. 16, 1956 K. R. HOYT 2,767,346
APPARATUS AND METHOD FOR REGULATING TELEVISION TARGET POTENTIAL
Filed Oct. 5, 1953 2 Sheets-Sheet 2
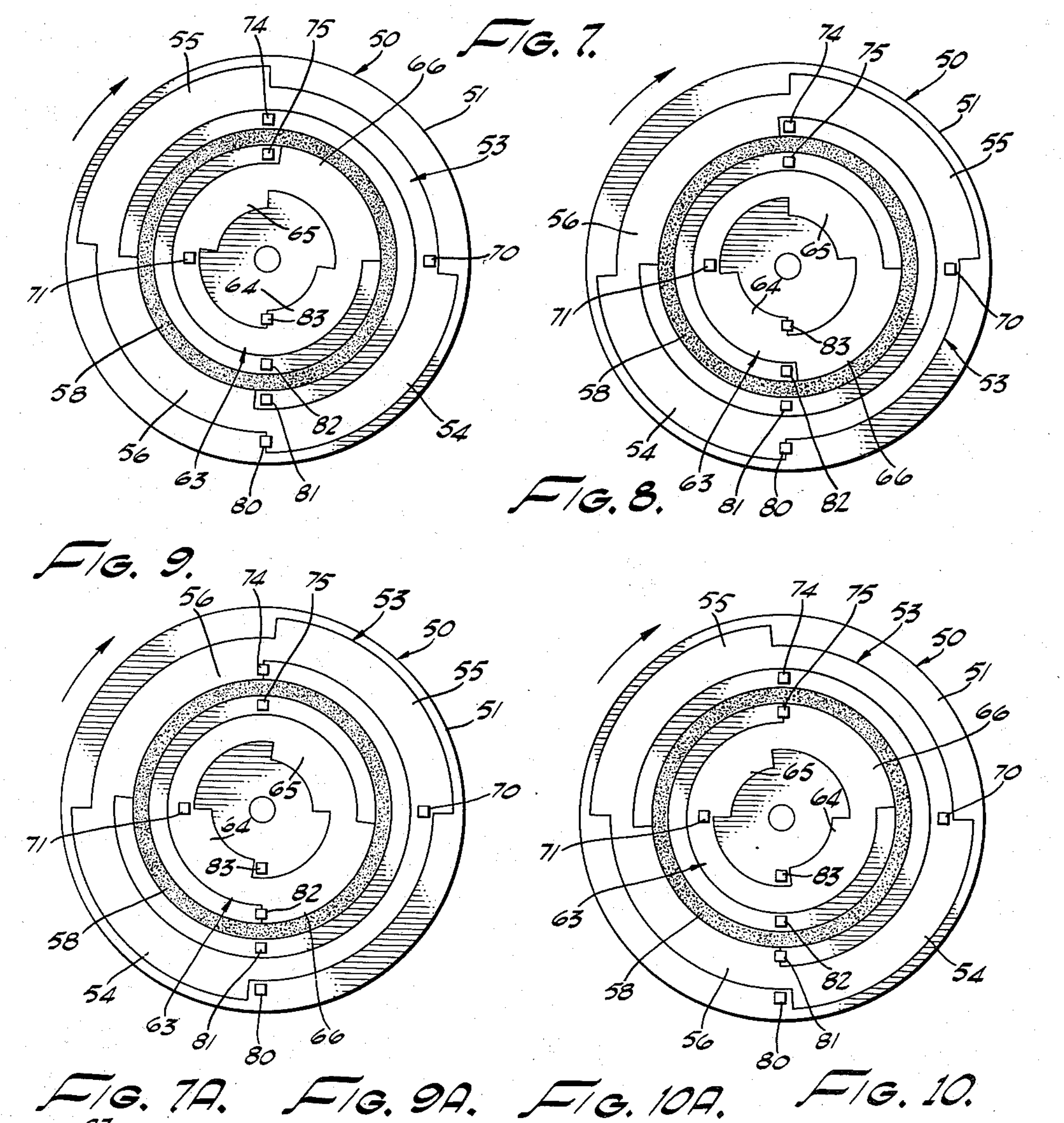
FIG. 7. FIG. 8. FIG. 9.
FIG. 10.
FIG. 7A. FIG. 9A. FIG. 10A.
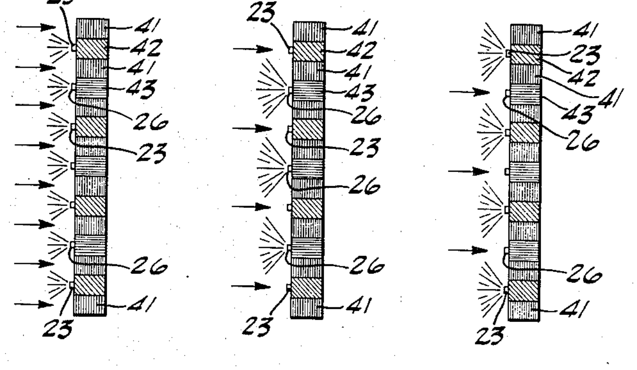
INVENTOR.
KARL ROBERT HOYT
BY Hedman B Hoar
AGENT 2,767,346
Patented Oct. 16, 1956

2,767,346

APPARATUS AND METHOD FOR REGULATING TELEVISION TARGET POTENTIAL

Karl Robert Hoyt, Newport Beach, Calif.

Application October 5, 1953, Serial No. 384,077
10 Claims. (Cl. 315—21)

This invention relates to apparatus and method for controlling variation of the potential applied to a television receiver target grid in order to compel the cathode beam of the receiver to follow a precisely pre-determined path.

In the scanning of two interlaced fields of an achromatic television receiver, it has been of no great consequence if the cathode beam moves slightly erratically in its downward vertical deflection. Such erratic movement is called line-jumping, but it will be appreciated that the target is composed of homogeneous phosphor and is devoid of lines having continuous existence. The observed lines are merely momentary creations of the passage of the cathode beam. It is customary to refer to the odd-line field and the even-line field, as if the beam followed a precise and fixed pattern, but actually the beam may start downward on a theoretical field of odd-lines, and due to electronic disturbances shift in mid-descent to theoretical even lines, or may repeat on odd lines instead of interlacing. In other words the beam and the resultant image drift slightly.

In black-and-white television, a drift of one line in 500 on a 10-inch vertical deflection amounts to only one-fiftieth of an inch and is hardly noticeable. As television receivers become larger, and particularly when the received images are projected upon a large screen, a single line-jump may become of optical importance. It is already desirable, even in black-and-white television to apply to a receiver target a grid of wires or other controls establishing a fixed interlace of lines, and by regulating the potential of such a grid to control precisely the path taken by the beam.

In my copending application, Serial No. 251,274, filed October 15, 1951, now abandoned, I have described a color television receiver target adapted to be installed in receiver tubes of the present standard of two-field interlace, in which lines of one field are all of one color, and lines of the other field are of a complementary color or are alternately of two colors complementary to the color of said one field. The receiver therein described is entirely compatible with black and white broadcasting. If video signals are received upon which color information has not been impressed, a clear black and white picture will be produced. If, however, by reason of line-jumping, one of the complementary colors is not developed, a white object in the image area of the line-jump will appear tinged by the other color or colors.

Vertical deflection controls for television receivers have been improved in recent years to the point where a receiver may operate for a considerable period of time, until for instance some extraneous electronic disturbance takes place, without the occurrence of line-jumping; and manual adjustment means are available for correcting line-jumping and restoring the cathode ray to the desired path, much like the controls for adjusting a color wheel to the desired color phase. Obviously, however, while a manually controlled receiver may be satisfactory as a novelty in the incipience of color television, an automatic control system is desirable for practical purposes.

It is an object of this invention to provide a receiver tube target having two interlaced linear fields, to correspond to the present standard two-field interlaced broadcasting system, and having means to constrain the cathode ray to follow lines of one target field and then lines of the other target field with precision. Such a receiver tube target or viewing screen may be used in achromatic broadcasting and reception or in color broadcasting and reception. On large tubes or when the picture is projected and magnified upon an external screen it will eliminate the blurring, or lack of resolution, which occurs when the cathode ray moves irregularly vertically.

Another object of the invention is to provide a color television receiver which prevents the cathode ray from straying from a color-producing element productive of color momentarily desired to a color-producing element productive of color momentarily undesired.

A further object of the invention is to provide a television target screen capable of producing black and white images of great steadiness and clarity and of producing color images having the added quality of color fidelity, without alteration of present standards of interlacing.

Still another object of the invention is to provide a color television target screen which is economical to manufacture.

A further object of the invention is to provide a method of applying a varied potential to a television target screen that will prevent line jumping of an image upon the screen when that image is produced by a two-field linear interlace.

In the accompanying drawings illustrative of presently preferred apparatus embodying my invention, Fig. 1 is a schematic view showing circuits for applying a varied potential to a receiver target screen;

Fig. 7 illustrates electrical switching means for applying a varied potential to the target screen in a desired phase sequence, shown for diagrammatic clarity as a face-contact disc commutator;

Figs. 8, 9 and 10 show the commutator of Fig. 7 in later stages of the phase cycle; and Figs. 7A, 9A, and 10A illustrate diagrammatically respectively the effect of the potential phases of Figs. 7, 9, and 10 upon a cathode ray striking an interlaced color screen of the type shown in Fig. 5.

Figures 1, 2, 3, 4, 5, 6:
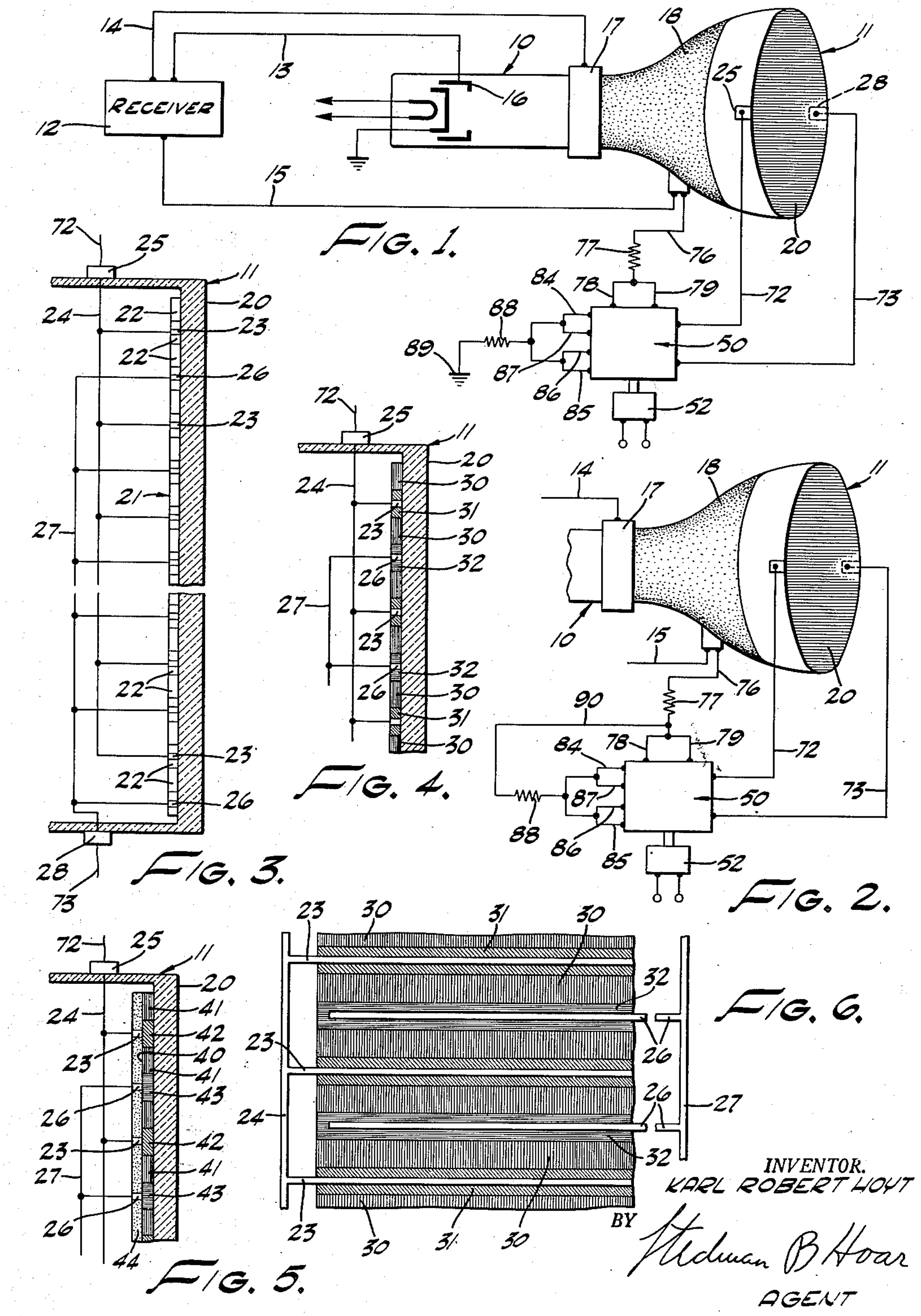
Fig. 2 is a schematic view showing another arrangement of circuits.
Fig. 3 is a vertical sectional view through a target screen, schematically showing the connection of the circuits to the screen.
Fig. 4 is a sectional view similar to Fig. 3 schematically showing application of the circuits of a preferred type of color screen.
Fig. 5 is another sectional view, schematically showing application of the circuits to a modified type of color screen.
Fig. 6 is a fragmentary elevational view of the target face of a color screen.

Having reference to the details of the drawings, I have shown schematically a cathode ray receiver tube 10, having a viewing screen 11 connected to receiver apparatus 12, the latter being illustrated conventionally and being understood to include the usual detectors, amplifiers, and controls, well understood in the art and to be found in varied forms in present receivers for black and white reception. Specifically I have shown circuit means 13, 14, and 15 connected respectively to a beam focussing anode 16, vertical and horizontal sweep control yoke 17, and output collector electrode 18 which may be a carbon deposit upon the interior of the bulbous portion of the tube 10. It will be understood that, for example, the electrode 18 is maintained at a high potential and that other sources of relatively high potential are accessible in the conventional apparatus.

The screen 11 is herein illustrated as being integral with the glass plate 20 forming the face of the tube 10, but it may be a separate unit. As shown in Fig. 3, a coating of phosphor 21 is applied directly to the glass plate 20, and this phosphor coating may be homogeneous and of a type to luminesce in white light in response to action of cathode beam. The path followed by the beam is shown as a series of interlaced lines 22. As the focussing anode 16 is capable of focussing the beam to a spot having the desired diameter of the interlaced "lines"—actually momentarily traced paths of the beam—the width of the interlaced line or paths may be predetermined, and indeed must be predetermined to arrange the conventional 525 lines or any other definite number of lines on screens of different sizes. At spacings equal to the width of four consecutive lines or paths 22, a grating of electro-conductive strips 23 is applied to the screen, the strips 23 being parallel to the paths 22, and one of the strips 23 coinciding with each fourth one of the paths 22. Like ends of the grating strips 23 are connected by a conductive strip 24 beyond the area of the paths 22, and the strip 24 is connected by a suitable lead to an electric connection 25 which may be on the exterior of the tube 10.

A second grating of electro-conductive strips 26 is applied to the screen 11, interlaced with the strips 23 and equally spaced therefrom. Thus while the strips 23 may coincide with, say, the second, sixth, tenth paths 22, the strips 26 will then coincide with the fourth, eighth, twelfth paths 22, being likewise spaced by the width of four of the paths. Like ends of the strips 26, preferably opposite to the ends of the strips 23 so connected, are connected by a conductive strip 27 which is suitably led to an electric connection 28.

In giving ordinal numbers, as above to the beam scanning paths, it will be understood that the reference is not to the actual order in which the beam scans paths upon a target, but is made with reference to the entire screen pattern, the paths being numbered in vertical order from the top of the screen as if endowed with permanent existence, instead of being transitory and in interlaced fields.

In applying electro-conductive material directly to a screen, such as the grating strips 23 and 26 applied to the screen 11, it is desirable to apply the strips directly to a hard surface. The strips 23 and 26 may be silver powder, applied by a painting or printing process, or by a decalcomania process as disclosed in my copending application, Serial No. 335,821, filed February 9, 1953. I have found that a phosphor coating, such as the coating 21, affords too soft and too rough a base for the application of very narrow electroc-conductive strips, and that it is desirable to divide the paths 22 by the strips 23 and 26, leaving a margin of each so-divided path on both sides of the dividing strip, rather than to cover the paths entirely or to interlace the strips between the paths. Therefore, if the width of the paths 22 is of the order of 0.03 inch or less, I prefer to apply narrow strips 23 and 26, of about 0.01 inch in width directly to the hard smooth glass plate 20 or equivalent hand smooth supporting surface, and to apply the phosphor coating 21 between the strips 23 and 26. On wide paths 22, the strips 23 and 26 may be applied to the surface of the phosphor coating in a very thin film, but still leaving the margins of the paths exposed on both sides of the overlying strips, thus apparently dividing the paths rather than actually dividing them by insertion.

If the tube 10 is to be used for television reception in color, the phosphor may be applied as an interlaced coating of colorable phosphors, which luminesce in complementary colors, such phosphors being well known in the art. As an example, illustrated in Fig. 4, the colorable phosphors may be applied to the glass plate 20 in one of the sequential arrangements disclosed in my above-mentioned application Serial No. 251,274. Red colorable phosphor strips 30, corresponding in width to the beam-paths of one of two interlaced scanning fields, may be interlaced with alternate green colorable phosphor strips 31 and blue colorable phosphor strips 32, which correspond to the beam-paths of the other interlaced scanning field. The gratings of fine electro-conductive strips 23 and 26 may be applied as above described and connected to electrical connections such as the connection 25 on the exterior of the tube 10. The grating of strips 23 may for example divide the green colorable phosphor strips 31, which might coincide with the second, sixth, tenth paths of the screen scanning pattern, and the grating of strips 26 would then divide the blue colorable phosphor strips 32 which would then coincide with the fourth, eighth, twelfth paths of the screen scanning pattern. The strips 23 and 26 are shown in Fig. 4 applied directly to the hard surface provided by the glass plate 20, but may be superimposed on the colorable strips if the latter are of sufficient width to support them and to provide marginal areas.

In the application of electro-conductive gratings to television screens it has hitherto been the practice either to make the gratings separate from the screen, usually standing in front of the screen as gratings of wires, or to interlace the grating lines between paths which the cathode ray follows. The advantage of my system of dividing the path lines of the ray is particularly noticeable in color television. The electronic penumbra produced by an off-standing wire system is reduced and greater brilliancy is produced on the path lines to which the ray is directed. If a positive voltage is applied to a path-interlaced grating system, as contrasted with my path-dividing system, it will attract the ray to the two adjacent ray-paths, which in a true field system of three colors would activate two colors simultaneously and in a two-field system as herein proposed would activate not only two colors but both fields simultaneously, causing incessant line-jumping. The path-interlaced systems are therefor limited to a repellant voltage only and to three field systems in which the ray is always repelled from two of the three fields. In contrast, my path-dividing system not only permits the use of either two or three colors in two fields but by reflection of light accentuates the brilliancy of the path lines divided by the grating strips.

As a modification of the color screen shown in Fig. 4, and in a sense a combination of the screens shown in Figs. 3 and 4, I have illustrated in Fig. 5 a screen in which colored transparent material, such as finely divided red, green, and blue glass is applied to the glass plate 20, in a suitable binding carrier. The finely divided glass and the binder therefore may be applied by decalcomania and when baked at a fusing temperature—which will also destroy the carrier to prevent subsequent out-gassing—a new hard glass surface 40 is fused to the inner face of the plate 20. The surface 40 may be arranged in a color sequence of glass strips 41 of red glass interlaced with alternate glass strips 42 of green glass and glass strips 43 of blue glass. A coating 44 of whitely luminescent phosphor is applied to the surface 40, divided by the electro-conductive gratings 23 and 26 in the manner previously described. Both the coating 44 and the gratings 23 and 26 will be founded upon the glass surface 40, assuring adhesion of the metallic powder forming the gratings, without electrical breaks in their continuity. The gratings 23 may divide the phosphor coating 4 at the centers of the green glass strips 42 coinciding with the second, sixth, tenth paths of the screen scanning pattern and the grating 26 may divide the phosphor coating 44 at the centers of the blue glass strips 43, coinciding with the fourth, eighth and tenth paths of the screen scanning pattern. Both gratings are individually led to outside electric connections, the connection 25 being shown.

To apply a regulating voltage to the gratings 23 and 26, the gratings are connected to any suitable switching device capable of passing an oscillating potential to the gratings. In the application of the principles of this invention to television of present standards of field frequency and interlace the rate of phase change need only be 60 changes per second, which is well within the capabilities of electro-mechanical switching or oscillating devices. For the sake of diagrammatic clarity the switching device is herein shown as a commutator 50, in which the sequence of phases can be easily observed, but it is to be understood that such a mechanical switch is not a necessary or even a preferred means of phase oscillation, and that the commutator is shown only as an example of a suitable device for applying a variable potential alternately to the gratings 23 and 26, and that other devices of like function may be substituted therefor, such as vibrators, capacitances, or electronic valves responsive to cyclical current of the frequency employed in determination of the field scanning frequency.

The commutator 50 is herein illustrated as a disc 51 rotated by a motor 52 driven by power in synchronization with the power operating the deflection yoke 17 to effectuate the roll-back between scanning field. Upon the face of the disc 51 is an annular metallic band 53, having two diametrically opposed side bands 54 and 55 which may be either outward or inward from the band 53, being shown as outward therefrom. The side bands 54 and 55 are preferably each slightly less than 90 degrees of arc in length, having the proportion to 90 degrees that the scanning time of one television field has to that scanning time plus the roll-back period between field scannings, that is, the proportion of the period during which the cathode ray is deflected downward to the period from the beginning of one field scanning to the beginning of the next field scanning. About 87 degrees arc is satisfactory. On the opposite side of the band 53, therefore being shown in this example as being inwardly of the band 53, is a third side band 56, of the same length in degrees of arc as the side bands 54 and 55. The side band 56 is disposed radially evenly between the side bands 54 and 55, with about 3 degrees of arc intervening between its ends and the adjacent ends of the side bands 54 and 55. The band 53 with its three side bands 54, 55 and 56 presents a unified electro-conductive surface to be brushed by the hereinafter described brushes.

Separated electrically from the band 53 and its side-bands by an insulating band 58 is a second annular band 63. The band 63 has side bands 64 and 65, shown herein as being inward from the band 63, and has a third side band 66 on the opposite side from the side bands 64 and 65. The side bands 64, 65, and 66, are counterparts of the side bands 54, 55, and 56, of the same arcuate length and having the same relative angular arrangement. However, the side bands 64 and 65 are disposed in the quadrants of the disc 51 that are interlaced with the quadrants in which the side bands 54 and 55 are disposed, and the side band 66 is disposed diametrically opposite to the side band 56.

Arranged to make contact respectively with the bands 53 and 63 at diametrically opposite points of the disc 51 are brushes 70 and 71. The brush 70 is connected to the terminal 25 and thence to the electrically conductive grating 23 by a circuit 72. The brush 71 is connected to the terminal 28 and thence to the electrically conductive grating 26 by a circuit 73. It will be apparent that since the bands 53 and 63 are continuous annular bands, the gratings 23 and 26 will at all times have potentials corresponding to the potentials of the instant of the bands 53 and 63 respectively.

To provide high potential to the bands 53 and 63, brushes 74 and 75 are disposed on the same radius of the disc 51, at radial distances such that the brush 74 makes contact with the side band 56 of the band 53, and the brush 75 makes contact with the side band 66 of the band 63. The brushes 74 and 75 receive a relatively high potential from any part of the receiver apparatus capable of acting as a source of potential, for example from the circuit 15 which feeds high potential to the output collector electrode 18. A lead 76 from the circuit 15 through a resistance 77, has branches 78 and 79 connecting respectively with the brushes 74 and 75. It will be apparent that high potential is fed through the lead 76, brushes 74 and 75, side bands 56 and 66 of the bands 53 and 63 to the gratings 23 and 26, during opposite quadrant phases of a four-phase cycle, the grating 23 receiving the high potential during one of said opposite phases and the grating 26 receiving the high potential during the other phase.

To remove the high potential from the gratings 23 and 26, at least to the extent of giving to those gratings a relative low potential, brushes 80, 81, 82, and 83 are provided on a radial line of the disc 51 diametrically opposite to the brushes 74 and 75. The brush 80 is outermost and disposed so as to be alternately in contact with the side bands 54 and 55 of the band 53. Next inwardly is the brush 81, disposed so as to make contact with the side band 56 of the band 53. Further inwardly and across the insulating band 58 in the area of the band 63, the brush 82 is disposed to make contact with the side band 66, and the brush 83 is disposed to make contact alternately with the side bands 64 and 65. Lead wires 84, 85, 86, and 87 respectively from the brushes 80, 81, 82, and 83 are joined and may lead through a resistance 88 to a ground 89 as shown in Fig. 1. Alternatively, instead of going to a ground 89, a circuit 90 may lead to the wire 76 between the resistance 77 and the branch wires 78 and 79.

The switching device 50, operated to change phase in synchronization with successive roll-backs or changes from the scanning of one of the interlaced fields to the scanning of the other field, alters the potential applied to the gratings 23 and 26 in a cycle of four phases, as follows:

Phase 1: Potential is drained from both gratings 23 and 26, leaving the field lines divided by these gratings at a low potential relative to the lines of the other, interlaced, field. Consequently the cathode ray, seeking a high potential target, is repelled from the field lines divided by the gratings and is attracted to the interlaced lines. In Phase 1, there is precise exclusion of the cathode ray from one field in favor of the other field.

Phase 2: A high potential is applied to one of the gratings, say the grating 23, and potential continues to be drained from the grating 26. The resulting difference between the attractive force on the grating 23 and the repellant force on the grating 26 causes what may be termed a barrier around the grating 26 to expand to repel the cathode ray not only from the field lines immediately contiguous to the grating 26, but also from the next contiguous lines which are the lines of the other field, traced by the ray during Phase 1. The ray now is both forced toward and attracted toward the field lines divided by the grating 23. In Phase 2, there is precise exclusion of the cathode ray from all but alternate lines of the field from which the ray was excluded during Phase 1.

Phase 3 is a repetition of Phase 1, both gratings being again drained of potential, and the ray being excluded from the same one field in favor of the same other field.

Phase 4 repeats Phase 2 but with reversed application of high and low potential to the two gratings. A high potential is applied to the grating 26 and potential is drained from the grating 23. An expanded electric barrier is thereby raised over the grating 23, excluding the ray from the lines divided by the grating 23 and from the contiguous lines of the other scanning field, and leaving the ray attracted only to the lines divided by the grating 26, these being the only lines hereto left unscanned during the four-phase cycle.

The combined result of the four-phase cycle is to eliminate line-jumping in the scanning of a two-field interlace. If the reception is achromatic, the image is steady and without drift and may be projected upon a large screen without blurring. If the receiver is arranged for color reception as hereinbefore described and the received signals do not carry color information, a clear black-and-white image will be produced because no line of the three complementary colors is ever jumped. If the received signals do carry color information in sequence coinciding with the color arrangement of the receiver scanning pattern, the image will have color fidelity because the cathode ray is constrained to follow only the paths colorable according to the color information of the instant. Figs. 7A, 9A and 10A respectively illustrate the effect obtained during Phase 1 and 3, Phase 2, and Phase 4 with a color screen of the arrangement shown in either of Figs. 4 or 5.

Operation of the disc commutator 50 is illustrated in Figs. 7, 8, 9, and 10, in which Fig. 7 shows the start of Phase 1, Fig. 8 shows the instant of roll-back between Phase 1 and Phase 2, Fig. 9 shows the start of Phase 2, and Fig. 10 shows the end of Phase 4. It will be understood that Phase 3 results from 180 degree rotation from Phase 1, the symmetrical arrangement of the bands and side bands producing like results in both orientations.

With this type of switching device the four phases result from the arrangement of the side bands in each of the electrically distinct rotor units, that is, the units composed of bands 53, 54, 55 and 56, and of bands 63, 64, 65 and 66. Each rotor has nearly continuous contact with one or another of the grounding brushes 80, 81, 82, and 83 for three consecutive quadrants of rotation and during the fourth quadrant has contact with a source of high potential, the said fourth quadrants of the two rotor units being diametrically opposed. The side bands 56 and 66 do double duty; grounding their units during one quadrant of rotation; and receiving potential while passing through the diametrically opposite quadrant. A sequence of phases in which both rotors are grounded, then one is charged while the other is grounded, then both are again grounded, and then the one is grounded while the other is charged, necessarily results.

In Fig. 7, rotation of the disc 51 being in the direction indicated by the arrow, the brushes 70 and 71 are, as always, in contact with their respective full annular bands 53 and 63. Neither of the brushes 74 or 75, connected to the high potential source 15, is in contact with any band, the side band 56 having 90 degrees to travel before reaching the brush 74, and the side band 66 having just passed beyond the brush 75. No high potential is therefor applied through the commutator to either of the gratings 23 and 26. Instead, the side band 54 has just reached the brush 80 which is in circuit with the ground 89, and potential is therefore drained from the grating 23 through the annular band 53 and side band 54 to the ground 89. Likewise the side band 64 has just reached the brush 83, thereby draining potential from the grating 26 through the annular band 63 and side band 64 to the ground 89. Therefore the conditions necessary to achieve Phase 1 exist.

In Fig. 8, only the brushes 70 and 71 are in contact with any band. During the instant of roll-back between field scannings, the commutator 50 is neutral in its effect upon the gratings 23 and 26.

In Fig. 9, representing rotation of 90 degrees from Fig. 7, and the start of Phase 2, the side band 56 has made contact with the brush 75. High potential is thereby made available to the grating 23 through wire 76, side band 56, annular band 53, brush 70, and wire 72. Side band 66 has made contact with brush 82, and potential is thereby drained from grating 26 through wire 73, brush 71, annular band 63, side band 66, brush 82, and wire 86 to the ground 89.

In Fig. 10, representing rotation of about 355 degrees from Fig. 1 and the end of phase 4, the side band 66 is still in contact with brush 75 and thereby still leads high potential from the wire 15 to the grating 26, while the side band 56 has more than 90 degrees to travel before reaching the brush 74. The grating 23, thereby out of contact with high potential, is still being drained of potential through the side band 56 and brush 81.

At present standards of two field interlace at a rate of sixty fields per second, each of the above-described four phases endures for one-sixtieth of a second. A disc rotation of 15 R. P. S. suffices and of course the disc may be made so small as to have little peripheral speed and to require insignificant power.

Because my invention is susceptible to numerous modifications of various elements shown herein by way of example, I desire to have the scope of the invention held broadly commensurate with the scope of the appended claims.

I claim:

1. In a television receiver having means for deflecting a cathode ray in a scanning pattern of two fields of interlaced linear paths: a screen having a smooth surface; material on said surface of said screen luminescently responsive to the action of said ray; a first electroconductive grating of metallic lines applied directly to said surface so as to divide said material, the lines of said grating being parallel to said interlaced paths and being spaced equally to the width of four of said interlaced paths; a second electroconductive grating of metallic lines also applied directly to said surface, the lines of said second grating being parallel to and interlaced with and equally spaced from the lines of said first grating and the lines of said gratings being of less width than said interlaced paths whereby a path coinciding with one of said grating lines extends marginally on both sides of said coinciding grating line; and means connected to each of said gratings for imposing cyclically on each of said gratings a varied potential with coincidence of low potential phases of both gratings alternating with the coincidence of a high potential phase of one of said gratings and a low potential phase of the other of said gratings and with coincidence of a low potentional phase of said one grating with a high potential phase of said other grating.

2. In a television receiver having means for deflecting a cathode ray in a scanning pattern of two fields of interlaced linear paths; a screen having a smooth glass-like surface; a grid of parallel strips on said surface coinciding in width and arrangement with said interlaced paths and illuminable in response to impingement of said cathode ray thereon; lines of electro-conductive material applied directly to said surface dividing alternate strips of said grid and arranged as two electro-conductive gratings coinciding with said divided strips, the lines of one of said gratings dividing the odd-numbered strips of said divided strips and the lines of the other of said gratings dividing the even-numbered strips of said divided strips; and means connected with said gratings for applying thereto consecutively a relatively low potential concurrently upon both of said gratings, a relatively high potential on one of said gratings concurrently with a relatively low potential on the other of said gratings, a relatively low potential concurrently upon both of said gratings, and a relatively low potential on said one grating concurrently with a relatively high potential on said other grating.

3. In a television receiver, the apparatus set forth in claim 2, in which the strips divided by one of said gratings are illuminable in one color, and the strips divided by the other of said gratings are illuminable in a second color, and the strips left undivided by said gratings are illuminable in a third color complementary to said one color and said second color.

4. A screen for a television receiver comprising: a plate having a hard smooth surface; luminescible material disposed on said surface of said plate; a grating of parallel lines of electro-conductive material applied directly to said surface dividing said luminescible material into surface-exposed strips interlaced with said grating lines and substantially wider than said grating lines so as to provide two possible interlaced series of paths of equal width for a cathode ray on said luminescible material, the paths of one of said series being interlaced between said grating lines and the paths of the other of said series being centered on said grating lines and being divided thereby.

5. A screen for a television receiver as set forth in claim 4 in which said luminescible material is luminescently colorable, the material in said one series of paths being colorable in one color and the material in said other series of paths being differently colorable.

6. A screen for a television receiver as set forth in claim 5, in which the material in said other series of paths is colorable in two colors jointly complementary to said one color, said two colors alternating on alternate interlacings of said other series.

7. A screen for a television receiver as set forth in claim 6, in which said grating lines are connected to form two interlaced individual gratings, one of said gratings dividing and diminishing in area the alternate interlacing of said other series characterized by one of said two colors, and the other said gratings dividing and diminishing in area the alternate interlacing of said other series characterized by the other of said two colors.

8. A screen for a television receiver as set forth in claim 4 in which strips of colored transparent material having substantially the hardness of glass underlie said luminescable material.

9. In a television receiver in which two interlaced fields are successively scanned: a commutator comprising two rotors electrically separate and mechanically in fixed phase relationship each of said rotors having an annularly continuous conductive band, said band having a first and a second side band each of approximately ninety degrees in annular extent and in opposite phase and extending from the same side of said band, and having a third side band on the opposite side of said band from said first and second side bands, said third side band being also approximately ninety degrees in annular extent and being in phase between the respective first and second side bands; said first and second side bands being in like phase on both rotors and said third side bands being in opposite phase; brushes and circuit means connected thereto connecting the annularly continuous portion of one of said bands to alternate field areas of one of said interlaced fields; brushes and circuit means connected thereto connecting the annularly continuous portion of the other of said bands to the remaining field areas of said one interlaced field; brushes and circuit means connected thereto connecting when in phase each of said third side bands to a zone of electric potential; brushes and circuit means connected thereto connecting when in phase said first and second side bands of both of said rotors to a zone of less electric potential than said first mentioned zone; and means for rotating said commutator synchronously with the scanning of said interlaced fields to provide phase changes coincident with the scanning roll-back.

10. In television, the method of controlling placement of a cathode ray upon predetermined areas of a target to make effective a two-field interlaced pattern projected by said ray upon said target which comprises: applying a relatively high potential to a first group of parallel electroconductive strips representative of alternate paths of said ray in one of said fields upon said target, and simultaneously applying a relatively low potential to a second group of similar strips interlaced with said first group and representative of the other paths of said ray in said one field, all of said strips being of widths less than the width of said paths; then simultaneously applying potentials of the order of said low potential to both of said groups of strips; then simultaneously applying a relatively low potential to said first group of strips and a relatively high potential to said second group of strips; and then again simultaneously applying potentials of the order of said low potential to both of said groups of strips; said applications continuing cyclically.

References Cited in the file of this patent

UNITED STATES PATENTS

| | | |
|---|---|---|
| 2,307,188 | Bedford | Jan. 5, 1943 |
| 2,446,249 | Schroeder | Aug. 3, 1948 |
| 2,446,791 | Schroeder | Aug. 10, 1948 |
| 2,529,485 | Chew | Nov. 14, 1950 |
| 2,577,368 | Schultz et al. | Dec. 4, 1951 |
| 2,671,129 | Moore | Mar. 2, 1954 |

FOREIGN PATENTS

| | | |
|---|---|---|
| 443,896 | Great Britain | Mar. 10, 1936 |